March 16, 1926.
W. McLAREN
PASTRY MAKING APPARATUS
Filed March 17, 1920
1,576,925
2 Sheets-Sheet 1
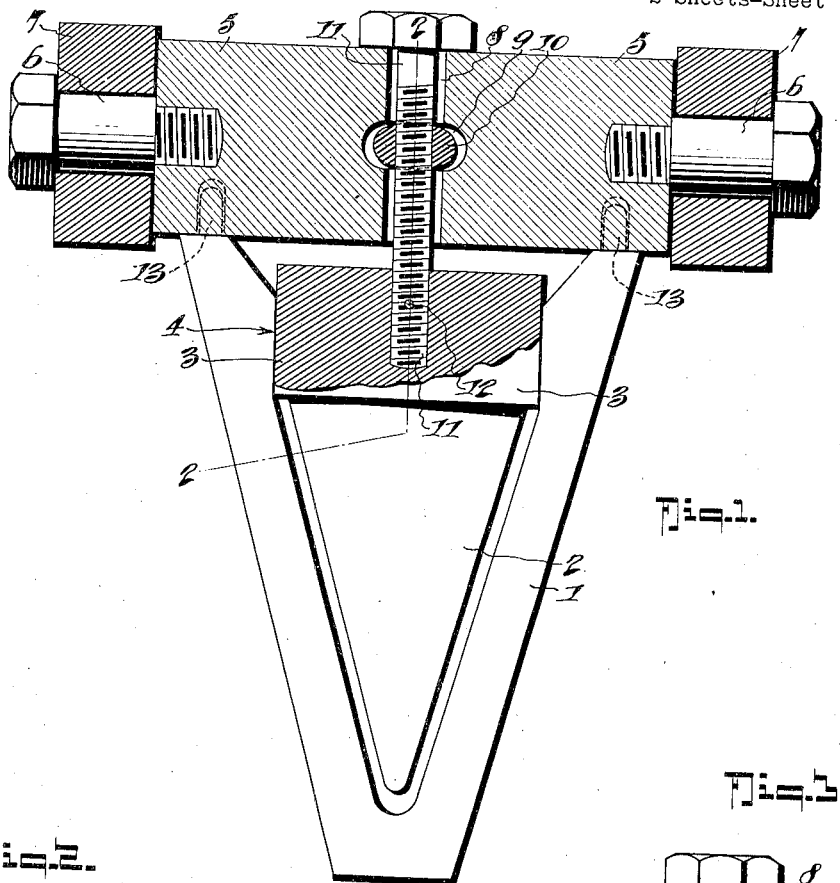
Fig.1.
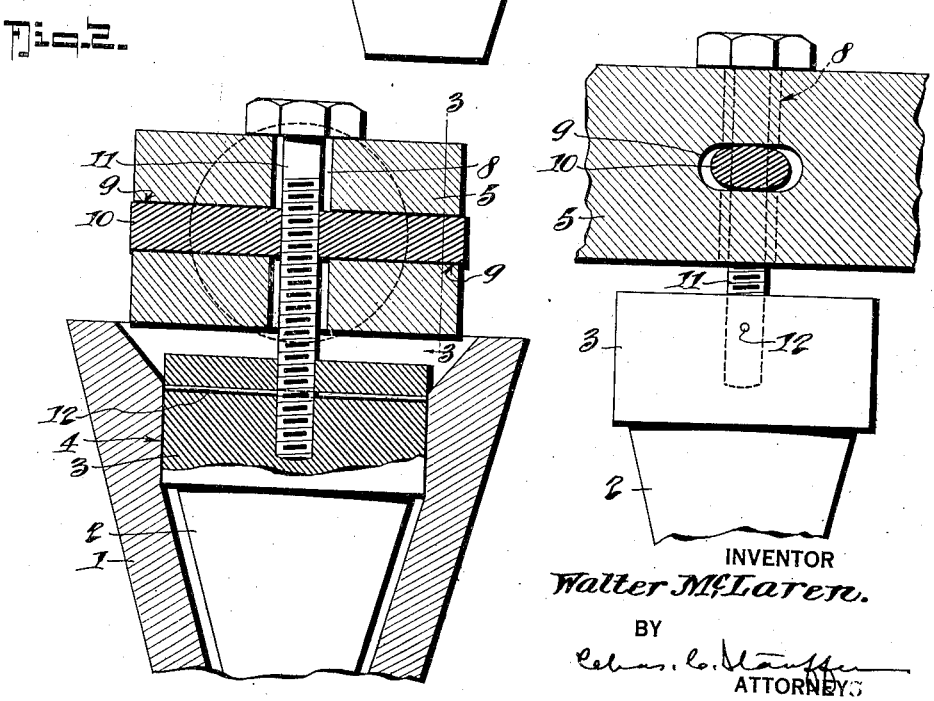
Fig.2.
Fig.3.
INVENTOR
Walter McLaren.
BY
ATTORNEYS March 16, 1926.
W. McLAREN
PASTRY MAKING APPARATUS
Filed March 17, 1920
1,576,925
2 Sheets-Sheet 2
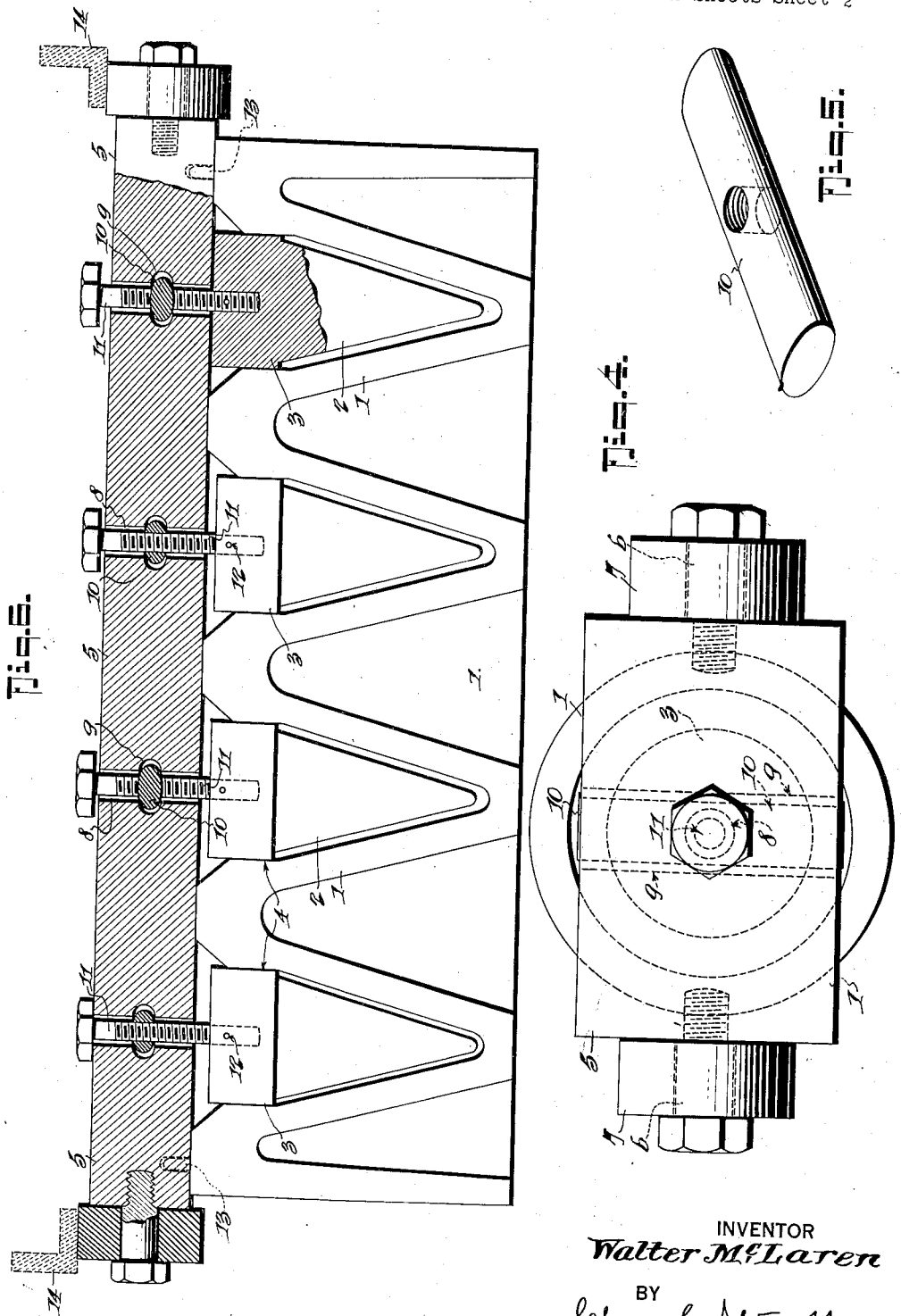
INVENTOR
Walter McLaren
BY
ATTORNEY Patented Mar. 16, 1926.

1,576,925

UNITED STATES PATENT OFFICE.

WALTER McLAREN, OF DAYTON, OHIO, ASSIGNOR, BY MESNE ASSIGNMENTS, TO THE McLAREN PRODUCTS COMPANY, A CORPORATION OF OHIO.

PASTRY-MAKING APPARATUS.

Application filed March 17, 1920. Serial No. 366,489.

*To all whom it may concern:*

Be it known that I, WALTER MCLAREN, a citizen of the United States, residing at Dayton, in the county of Montgomery and State of Ohio, have invented a new and Improved Pastry-Making Apparatus, of which the following is a specification.

My present invention has for its object to provide mechanism for use in machines for manufacturing cup pastry whereby the method of preventing waste of batter such as is disclosed in Patent No. 1,438,541, issued December 12, 1922, may be advantageously carried out in a mechanical way, and the present invention further has for its object to provide additional means and method of mounting the cores on the core bar whereby it will be possible to adjust the amount of displacement of the core in the mold cavity to compensate for irregularities in the cubical content or capacity of the respective female mold recesses.

In the practical application of my waste prevention method to automatic cone making machines it is desirable to avoid too much compression in the batter when the core is finally seated. Therefore, it is one of the objects of my present invention to provide mechanism whereby, while the machine is in operation, the attendant can adjust one or more of the cores as needed so that the density of the product in each mold cavity may be uniform. In its general nature the present invention resides in providing a core bar with a mechanism by which the core is mounted on the core bar in such manner that the core is free to move in a direction at right angles to its axis while maintaining its axis at all times parallel to the axis of the mold cavity when the parts are in the operative position and yet enable an attendant to adjust the core in the direction of its axis to regulate the displacement of the core in the mold cavity to compensate for any variation in the capacity of the mold cavity, thus enabling each core to be independently adjusted while the machine is in operation.

In its more detailed nature, the invention includes those novel features of construction, combination and arrangement of parts, all of which will be first fully described, specifically pointed out in the appended claims and illustrated in the accompanying drawings, in which:

Figure 1 is a vertical section and part elevation of a single cavity mold unit containing the present invention.

Figure 2 is a detail cross section on the line 2—2 of Figure 1.

Figure 3 is a detail cross section on the line 3—3 of Figure 2.

Figure 4 is a top plan view of the structure shown in Figure 1.

Figure 5 is a detail perspective view of one of the cross pins or nut members that cooperates with the core carrying screw.

Figure 6 is a central vertical longitudinal section and part elevation of a mold unit provided with a plurality of cavities and cores and illustrates how the several cores may be independently adjusted after they have been inserted in the mold cavity.

In the drawings, in which like numerals and letters of reference indicate like parts in all of the figures, 1 represents the female mold which is preferably of the sectional type and is provided with the usual cavity for the reception of the core 2, the cavity having a throat 4 to receive the core head 3, the construction of the mold and core being preferably that disclosed in my co-pending application before referred to. 5 designates the core bar which also may be of the usual construction and may be provided with stud bolts 6 on which the core bar carrying rollers 7 are mounted, the latter, when the invention is used in an automatic machine, being engaged by the core locking tracks 14 which hold the core bar down on the mold. Any suitable means 13 may be provided for keeping the core bar against movement with relation to the mold when the core bar is brought into operative position with respect to the mold.

In carrying out my present invention, the core bar is bored vertically as at 8 and transversely as at 9 to form a crossed passage through the core bar. 10 designates a cross pin adapted to lie in the transverse bore 9 of the core bar. The cross pin 10 may be of any desired cross sectional shape, although it is preferable to make it with flat top and bottom surfaces so as to have no up and down movement in the cross bore 9 while allowing, however, for movement in a direction normal to the axis of the core.

11 designates a core bolt which is passed through the bore 8 and is of lesser diameter than the bore 8 so that the cross bolt may have lateral movement in all directions, the bolt passing through a threaded opening in the pin 10 and being secured at 12 to the core 2 in any desired manner. The cross pin 10 therefore serves as a nut member on the core bolt 11 and makes it possible to hold the core bolt against movement in the direction of its axis except while an adjustment is being made, thus holding the core in a position to maintain a fixed distance between the core and the core bar once an adjustment has been made.

While my invention is adapted for use on single cavity mold units it is especially useful, however, in connection with automatic machinery since it enables me to adjust each individual core independently of the others during the operation of the machine when all of the working conditions are present.

In operating a machine embodying the present invention all cores on the machine are first adjusted to fit tightly against the bottom of the core bar (see right hand core, Figure 6) and the batter pump is adjusted so that the amount discharged into the several pockets of the female mold is just about enough to form a perfect cone.

Some of the cones, it will be found, will fill perfectly while others will not quite fill because the displacement of the core is too little, due to the variation in the size or cubical capacity of the female mold cavities usually caused by inequalities in the filigree work in the molds. As the machine continues running the cores in the cavities which do not quite fill are very slightly lowered by turning the bolt 11 of the particular cores in question with a wrench until the cones are perfect throughout the entire machine without making it necessary to greatly compress the batter upon final seating of the cores, as described in my method application hereinbefore referred to.

From the foregoing it will be observed that the provision of the independent adjustment of the several cores, as described, makes it possible to compensate not only for inequalities because of imperfect filigree work, etc. but also makes it possible to compensate for inequalities of the amount of the batter charge, due to variations in the action of the batter charging pump.

It is obvious that numerous changes in the details of construction of the apparatus employed may be made without departing from the spirit of the invention or the scope of the appended claims.

What I claim is:

1. In pastry molding apparatus, a core bar, a core, means for mounting the core on the bar and including provisions for laterally moving the core while holding it rigidly against longitudinal or axial movement when in use, said means including means whereby the core may be longitudinally adjusted during use a greater or lesser distance from the core bar.

2. In pastry molding apparatus, a core bar having a transverse laterally elongated aperture, a nut member held in said aperture, said core bar having a second aperture at right angles to the first aperture and intersecting the same, a bolt passing through said second aperture and cooperating with said nut, and a core secured to said bolt, all being arranged whereby the core will have lateral movement with respect to the axis of the core and whereby the core may be adjusted longitudinally of its axis while the core bar remains stationary.

3. In apparatus of the class described, the combination with the female mold unit having a plurality of cavities, a single core bar, a plurality of cores separately mounted on the core bar, there being one core for each cavity, said core bar adapted to be held relatively fixed with relation to the female mold unit and independent means for adjusting the penetration of the several cores in their respective cavities while the core bar lies in operative relation to the female mold unit and the cores are inserted into the cavities thereof, said last named means comprising a core bolt passing through an aperture in the core bar, said core bar having provisions whereby said core bolt may move in a direction normal to its axis to allow centering of the core in the mold cavity, substantially as shown and described.

WALTER McLAREN.